(12) United States Patent
Coakley et al.

(10) Patent No.: US 7,882,852 B2
(45) Date of Patent: Feb. 8, 2011

(54) DIRECT DRIVE SERVOVALVE DEVICE WITH REDUNDANT POSITION SENSING AND METHODS FOR MAKING THE SAME

(75) Inventors: Kim Coakley, Castaic, CA (US); Russell Bessinger, Palmdale, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 1094 days.

(21) Appl. No.: 10/838,568

(22) Filed: May 4, 2004

(65) Prior Publication Data
US 2005/0247350 A1 Nov. 10, 2005

(51) Int. Cl.
*F16K 37/00* (2006.01)
(52) U.S. Cl. .................... 137/552; 137/554; 251/129.11
(58) Field of Classification Search ................. 137/552, 137/554, 15.18; 251/129.11, 129.03; 340/686.1; 1/552, 554
See application file for complete search history.

(56) References Cited

U.S. PATENT DOCUMENTS

| | | | |
|---|---|---|---|
| 3,055,654 A * | 9/1962 | Harrison et al. ............ 269/241 |
| 3,517,283 A * | 6/1970 | Mccullough ................ 318/574 |
| 4,275,703 A | 6/1981 | Bodig et al. ................ 123/617 |
| 4,393,319 A * | 7/1983 | Bock .......................... 310/80 |
| 4,772,929 A | 9/1988 | Manchester .................. 357/27 |
| 4,965,517 A | 10/1990 | Shelton et al. .............. 324/174 |
| 5,115,194 A | 5/1992 | Luetzow et al. ........... 324/207.2 |
| 5,237,272 A | 8/1993 | Murata et al. ............ 324/207.2 |
| 5,244,002 A | 9/1993 | Frederick ....................... 137/1 |
| 5,264,792 A | 11/1993 | Luetzow et al. .......... 324/207.2 |
| 5,321,355 A | 6/1994 | Luetzow ..................... 961/87 |
| 5,325,005 A * | 6/1994 | Denk ....................... 310/68 B |
| 5,787,915 A | 8/1998 | Byers et al. .................... 137/1 |
| 6,034,493 A * | 3/2000 | Boyd et al. ................. 318/254 |

(Continued)

FOREIGN PATENT DOCUMENTS

DE 102 23 362 A1 12/2003

(Continued)

OTHER PUBLICATIONS

Micronas HAL 805 Programmable Linear Hall Effect Sensor Product Information, pp. 1-3.*

(Continued)

*Primary Examiner*—Stephen Hepperle
*Assistant Examiner*—Andrew J Rost
(74) *Attorney, Agent, or Firm*—BainwoodHuang (57) ABSTRACT

A direct drive servovalve device includes (i) a servovalve motor having a stator and a rotor assembly configured to rotate relative to the stator, (ii) a valve member coupled to the rotor assembly, and (iii) a sensor assembly. The sensor assembly includes an interface configured to couple to a controller that controls the servovalve motor, a set of programmable Hall sensors coupled to the interface, and a support. The support (e.g., a ring-shaped collar or sleeve) supports the set of Hall sensors at an installation location which is (i) adjacent to the rotor assembly and (ii) fixed relative to the stator. The set of programmable Hall sensors is configured to provide a set of position signals to the controller through the interface. The set of position signals identifies a rotational position of the rotor assembly relative to the stator.

12 Claims, 4 Drawing Sheets

U.S. PATENT DOCUMENTS

| | | | |
|---|---|---|---|
| 6,098,646 A * | 8/2000 | Hennemann et al. | 137/101.19 |
| 6,152,172 A | 11/2000 | Christianson et al. | 137/554 |
| 6,288,567 B1 | 9/2001 | Fink et al. | 326/38 |
| 6,300,739 B1 | 10/2001 | Ratliff et al. | 318/689 |
| 6,334,604 B1 | 1/2002 | Roth | 251/129.11 |
| 6,460,567 B1 * | 10/2002 | Hansen et al. | 137/554 |
| 6,476,600 B2 * | 11/2002 | Kono et al. | 324/207.2 |
| 6,497,035 B1 | 12/2002 | Ratliff | 29/596 |
| 6,498,479 B1 * | 12/2002 | Hamaoka et al. | 324/207.2 |
| 6,650,073 B2 * | 11/2003 | Kawabata | 318/254 |
| 6,687,590 B2 * | 2/2004 | Kifuku et al. | 701/43 |
| 6,729,299 B2 * | 5/2004 | Anschicks et al. | 123/399 |
| 6,995,679 B2 * | 2/2006 | Eskritt et al. | 340/686.1 |
| 7,301,328 B2 * | 11/2007 | Babin | 324/207.25 |
| 2002/0021124 A1 | 2/2002 | Schott et al. | 324/207.2 |
| 2003/0006753 A1 | 1/2003 | Lancaster et al. | 324/117 |
| 2004/0100252 A1 * | 5/2004 | Babin | 324/207.25 |

FOREIGN PATENT DOCUMENTS

| | | |
|---|---|---|
| WO | WO 95/20781 | 8/1995 |
| WO | WO 03098147 A1 * | 11/2003 |

OTHER PUBLICATIONS

Micronas HAL 810 Programmable Linear Hall Effect Sensor Product Information, pp. 1-3.*

Micronas HAL 815 Programmable Linear Hall Effect Sensor Product Information, pp. 1-3.*

Microsystems Design Group, "High Sensitivity Hall Sensor", Dec. 1, 2003, lmis3.epfl.ch/research/old/cylhall/.

Micronas, "Sensors Overview and System Solutions", Jan. 30, 2004, www.micronas.com/products/overview/sensors/index.php.

Melexis, "MLX90215 Precision Programmable Linear Hall Effect Sensor", Aug. 2002.

Search Report from PCT/US2005/008223 filed on Nov. 3, 2005, Total Pages: 3.

Melexis, Microelecronic Intergrated Systems, MLX90215, Precision Progammable Linear Hall Effect Sensor, Jul. 6, 2001.

Melexis, Microelecronic Intergrated Systems, MLX90215, Precision Progammable Linear Hall Effect Sensor, Aug. 2002.

* cited by examiner

DIRECT DRIVE SERVOVALVE DEVICE WITH REDUNDANT POSITION SENSING AND METHODS FOR MAKING THE SAME

BACKGROUND

A typical direct drive servovalve includes a housing, a valve member (e.g., a spool, a poppet, etc.), a motor and a sensor. The housing defines a fluid pathway, and the valve member is configured to move within the fluid pathway between an open and closed position in order to control the amount of fluid flow within the pathway. The motor includes a stator which resides in a fixed position relative to the housing, and a rotor assembly which, if required, includes motor magnetics, a shaft and Hall sensor magnets. The rotor assembly (i) is configured to rotate relative to the stator and (ii) is linked to the valve member to control movement of the valve member within the housing. The sensor is configured to sense a present position of the servovalve (e.g., directly sense position of the valve member within the fluid pathway, directly sense a rotational orientation of the rotor assembly, etc.).

During operation, an electronic controller receives a command signal (e.g., from a user input device) directing the controller to operate the servovalve in a particular manner (e.g., increase flow, decrease flow, terminate flow, etc.). The controller also receives a position signal from the sensor thus enabling the controller to determine the present position of the valve member within the fluid pathway. The controller then sends a control signal to the motor based on both the command signal and the position signal (i.e., the controller outputs current through coils within the stator) to control the rotational orientation of the rotor assembly. As a result, the rotor assembly moves the valve member to a desired position within the fluid pathway thus controlling amount of fluid flow.

There are a variety of conventional approaches to sensing the present position of the servovalve. One conventional approach involves using a Hall effect transducer (i.e., a single analog Hall effect element) as the servovalve sensor. In this approach (hereinafter referred to as the conventional Hall effect transducer approach), the Hall effect transducer is initially positioned so that a null point is aligned with a maximum torque position of the motor. Then, as the rotor assembly moves to position the valve member within the fluid pathway, the Hall effect transducer outputs a signal which varies in voltage as the rotor assembly moves in either direction (clockwise or counterclockwise) from the null point.

Another conventional approach involves using a linear variable differential transformer (LVDT) as the servovalve sensor. In this approach (hereinafter called the conventional LVDT approach), a movable core of the LVDT moves in correspondence with movement of the valve member within the fluid pathway. One or more sensing coils of the LVDT then outputs a signal identifying the present position of the LVDT movable core and thus the present position of the valve member within the fluid pathway.

SUMMARY

Unfortunately, there are deficiencies to the above-described conventional approaches to sensing a present position of a servovalve. For example, neither of the above-described conventional approaches is particularly well-suited for aerospace applications which require redundancy. Without such redundancy, a single point of failure in a servovalve system could result in a catastrophic loss. A further explanation of the drawback with each particular approach will now be provided.

In connection with the above-described conventional Hall effect transducer approach, one might contemplate simply installing multiple Hall effect transducers within the servovalve in order to obtain redundancy. Unfortunately, this is not a simple endeavor. In particular, it would be very difficult to mechanically position all of the Hall effect transducers so that their null positions were properly synchronized with the peak torque position of the rotor assembly. Additionally, to implement such a configuration, the rotor assembly would likely need to be extended in length to provide room for each Hall effect transducer, thus raising tolerance stack-up and motor redesign concerns. Furthermore, if one of the Hall effect transducers does not have its null position set properly, it is essentially rendered useless since it will not reliably provide position sensing for the full range of movement of the servovalve. Moreover, even if physical synchronization of the null positions is finally achieved, the gain from one Hall effect transducer to another tends to vary due to variations in magnet strength and sensor locations from servovalve to servovalve. Accordingly, additional circuitry or adjustments would be required at the controller to account for the gain differences provided by the Hall effect transducers. As a result, if a faulty servovalve were ever replaced with a new servovalve, the controller would need to be re-adjusted to compensate for the specific gains provided by the individual Hall effect transducers of the new servovalve.

Furthermore, in connection with above-described conventional LVDT approach, LVDT devices tend to be costly. Additionally, it is difficult to link multiple LVDT cores to the valve member of the servovalve, and such links pose potential new points of failure.

In contrast to the above-described conventional approaches to sensing present positions of servovalves, embodiments of the invention are directed to techniques for providing position feedback for servovalve motor operation using a set of programmable Hall sensors. Each programmable Hall sensor is capable of having programmed adjustments made to set its null position and its gain, thus enabling convenient synchronization of all null positions with a peak torque position of the motor as well as standardization of all gains. The use of such programmable Hall sensors alleviates the need to physically synchronize the null position of each sensor (e.g., a programmed null offset value for each sensor will easily synchronize null positions) as well as alleviates the need for making adjustments to a servovalve controller in an attempt to accommodate different gains (e.g., each sensor is capable of being programmed to have the same standard gain). Moreover, programmable Hall sensors (i) are relatively inexpensive compared to conventional LVDT devices thus making their use commercially practical, and (ii) are quite small thus enabling at least the sensing portions of the programmable Hall sensors to be co-located adjacent to a rotor assembly of a servovalve motor.

One embodiment of the invention is directed to a servovalve device which includes (i) a servovalve motor having a stator and a rotor assembly configured to rotate relative to the stator, (ii) a valve member coupled to the rotor assembly, and (iii) a sensor assembly. The sensor assembly includes an interface configured to couple to a controller that controls the servovalve motor, a set of programmable Hall sensors coupled to the interface, and a support. The support (e.g., a ring-shaped collar or sleeve) supports the set of programmable Hall sensors at an installation location which is (i) adjacent to the rotor assembly and (ii) fixed relative to the stator. The set of programmable Hall sensors is configured to provide a set of position signals to the controller through the interface. The set of position signals identifies a rotational position of the rotor assembly relative to the stator. Such a servovalve device is well-suited for certain applications such as those within the aerospace industry where redundant position feedback is useful in avoiding catastrophic failures, e.g., a multi-channel Hall feedback application for Direct Drive Valve-type servovalves.

In one embodiment, the servovalve device manufacturing process involves attaching a set of programmable Hall sensors to a support, and positioning the support relative to a direct drive servovalve motor having a stator and a rotor assembly configured to rotate relative to the stator. The process further involves rotating the support relative to the rotor assembly until all of the programmable Hall sensors reside in an operating range relative to the rotor assembly of the direct drive servovalve motor. Such a process enables subsequent programming of (i) null positions (e.g., null point offsets) to synchronize the null position of each programmable Hall sensor, and (ii) gains (e.g., gain adjustment values) to make the performance of each servovalve device uniform from device to device thus alleviating the need for adjusting a controller to account for individual gain differences between devices.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for providing redundant position feedback for direct drive servovalve motor operation using a set of programmable Hall sensors. Each programmable Hall sensor is capable of having programmed adjustments made to set its null position and its gain, thus enabling convenient synchronization of all null positions as well as normalization of all gains. The use of such programmable Hall sensors alleviates the need to mechanically synchronize the null position of each sensor with the peak torque position of the motor (e.g., a programmed offset for each sensor will easily synchronize null positions) as well as alleviates the need for making adjustments to a servovalve controller in an attempt to accommodate different gains (e.g., each sensor is capable of being programmed to have the same standard gain). Moreover, programmable Hall sensors are relatively inexpensive compared to conventional LVDT devices thus making them commercially practical, and are quite small thus enabling at least the sensing portions of the programmable Hall sensors to be co-located adjacent to a rotor assembly of a servovalve motor without modifying the motor.

Figure 1:
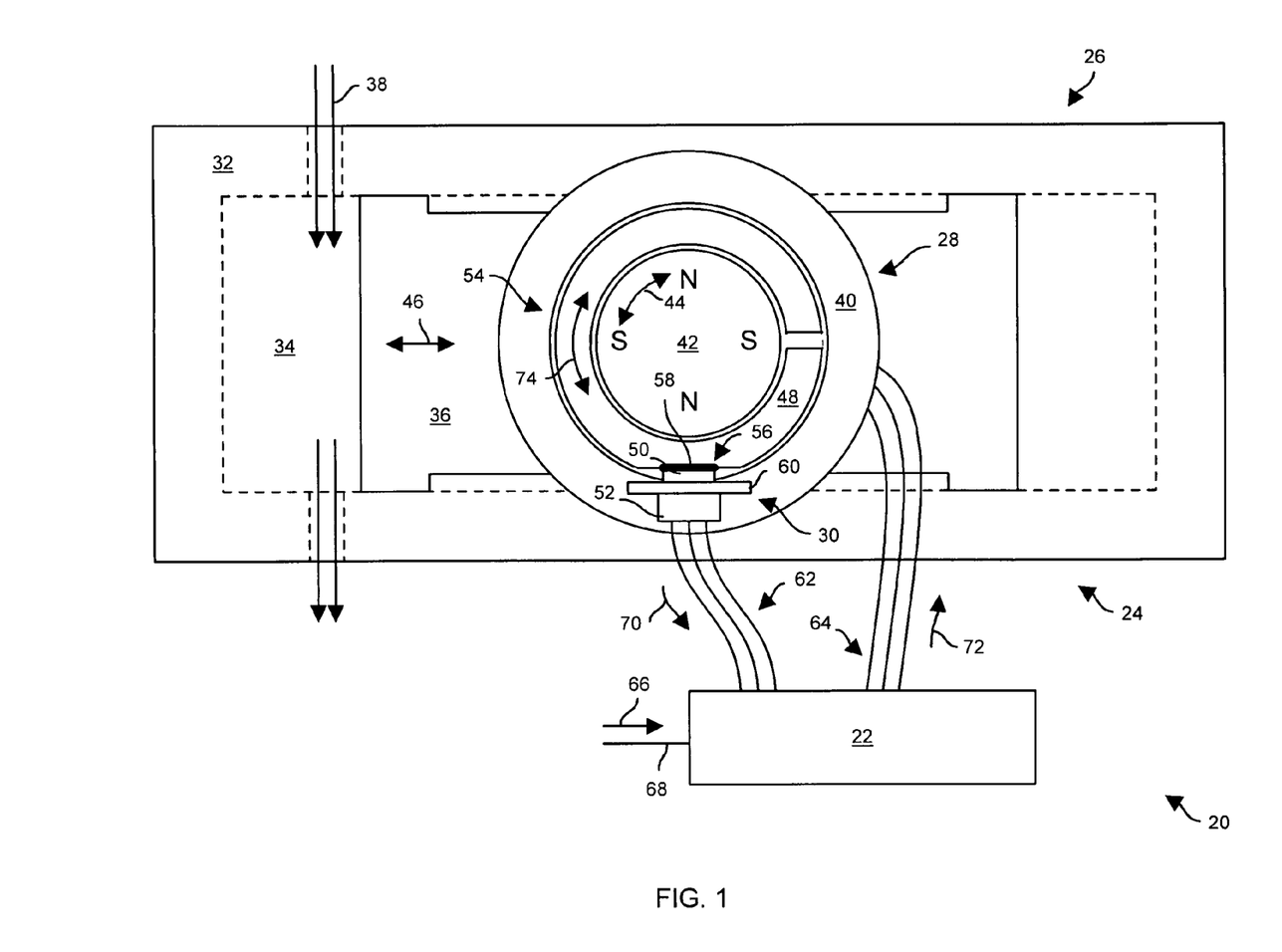
FIG. 1 is a diagram of a direct drive servovalve control system which is suitable for use by the invention.

FIG. 1 shows a direct drive servovalve control system 20 which is suitable for use by the invention. The servovalve control system 20 includes an electronic controller 22 and a servovalve device 24. The servovalve device 24 includes a valve assembly 26, a direct drive servovalve motor 28, and a sensor assembly 30. The valve assembly 26 includes a housing 32 defining a fluid pathway 34, and a valve member 36 which is configured to control the amount of fluid 38 flowing through the fluid pathway 34. It should be understood that the valve member 36 is shown as a spool by way of example only. It should be further understood that the valve assembly housing 32 includes an input to the fluid pathway 34 and an output to the fluid pathway 34 on the left-hand side of the servovalve motor 28 by way of example only. A variety of other servovalve geometries and configurations are suitable for use by the invention as well (e.g., multiple fluid pathway configurations, poppet configurations, ball-valve configurations, other Direct Drive Valve spool configurations, etc.).

As shown in FIG. 1, the direct drive servovalve motor 28 includes a stator 40 and a rotor assembly 42. The stator 40 is in a fixed position relative to the valve assembly housing 32, and the rotor assembly 42 is configured to rotate to particular angular positions relative to the stator 40 (see the arrow 44 in FIG. 1) in response to particular currents passing through coils of the stator 40. The rotor assembly 42 couples to the valve member 36 (e.g., via linkage) so that, as the rotor assembly 42 rotates relative to the stator 40, the rotor assembly 42 moves the valve member 36 within the fluid pathway 34 (e.g., the rotational movement of the rotor assembly 42 translates into linear movement of the valve member 36, also see the arrow 46 in FIG. 1) to vary the amount of fluid 38 flowing through the fluid pathway 34. In some arrangements, the rotor assembly 42 includes magnets (one or more 2-pole magnets, one or more 4-pole magnets, etc.) which are mounted around a rotor shaft. In other arrangements, the rotor assembly 42 includes a Hall sensor magnet in addition to magnets mounted around a rotor shaft. In one arrangement, the rotor assembly 42 is configured to rotate within a limit arc range (e.g., +/−20 degrees) in order to drive the valve member 36 between a fully closed position and a fully open position.

As further shown in FIG. 1, the sensor assembly 30 includes a support 48, a set of programmable Hall sensors 50, and an interface 52. The support 48 is configured to reside at an installation location 54 which is fixed relative to the valve assembly housing 32 and the stator 40. When the support 48 is installed at the installation location 54, the support 48 supports the set of Hall sensors 50 such that a sensing portion of each sensor 50 is adjacent the rotor assembly 42 for robust and reliable magnetic flux sensing. Each programmable Hall sensor 50 electrically couples to the interface 52 to enable that sensor 50 to derive power, obtain information and provide information through the interface 52 in a multi-channel manner for redundant position feedback.

In some arrangements, the support 48 includes a ring-shaped collar or sleeve which defines a common sensing area 56 and adhesive 58 which robustly holds the set of programmable Hall sensors 50 in place. In some arrangements, the sensing portions of the programmable Hall sensors 50 attach to the common sensing area 56 via the adhesive 58. In some arrangements, both the interface 52 and the programmable Hall sensors 50 reside on a printed circuit board 60 which is assembled prior to attachment to the support 48. Traces within the circuit board 60 electrically interconnect the programmable Hall sensors 50 to the interface 52 (e.g., a circuit board connector).

As further shown in FIG. 1, the electronic controller 22 couples to the interface 52 through a set of connections 62.

Similarly, the electronic controller 22 couples to the stator 40 through another set of connections 64. The electronic controller 22 is capable of being located in relatively close to proximity to the servovalve device 24 (e.g., adjacent to the servovalve device 24 so that the controller 22 is essentially integrated with the servovalve device 24 itself), or at a remote distance from the servovalve device 24 (e.g., in such a remote manner that gain adjustment by the controller 22 is impractical or inappropriate).

During operation, the controller 22 receives a command signal 66 through an input 68, and a set of position signals 70 from the set of programmable Hall sensors 50 through the connections 62. The command signal 66 (e.g., from a user input device, from an automated computerized device, etc.) instructs the controller 22 to operate the servovalve device 24 such that a particular amount of fluid 38 flows through the fluid pathway 34. The set of position signals 70 identify the present rotational orientation of the rotor assembly 42 to the controller 22. Accordingly, the controller 22 generates a set of control signals 72 based on the command signal 66 and the set of position signals 70, and sends the set of control signals 72 to the stator 40 through the connections 64 (e.g., a set of currents to coils within the stator 40) to control the position of the rotor assembly 42 and thus position of the valve member 36 within the valve assembly housing 32. In one arrangement, the stator 40 includes multiple coils (e.g., four) for redundancy and any one of the control signals 72 is capable of driving the rotor assembly 42.

It should be understood that the sensor assembly 30 is easily installable onto the motor 28 (or alternatively the housing 32) when manufacturing the servovalve device 24. In particular, the support 48 fits over and easily rotates around the rotor assembly 42. As a result, a manufacturer is capable of fastening the programmable Hall sensors 50 to the area 56 of the support 48 using adhesive 58 in a relatively coarse manner. In particular, the manufacturer is capable of adhering the sensors 50 to the support 48 either together (e.g., when mounted to a circuit board 60) or one at a time. The manufacturer is then capable of making fine adjustments to the position of programmable Hall sensors 50 relative to both the rotor assembly 42 and the stator 40 simply by turning the support 48 (see the arrow 74 in FIG. 1). Once the support 48 is properly positioned, the manufacturer is capable of locking the support 48 into place, e.g., using a set screw, using adhesive, etc. Further details of certain embodiments of the invention will now be provided with reference to FIG. 2.

Figure 2:
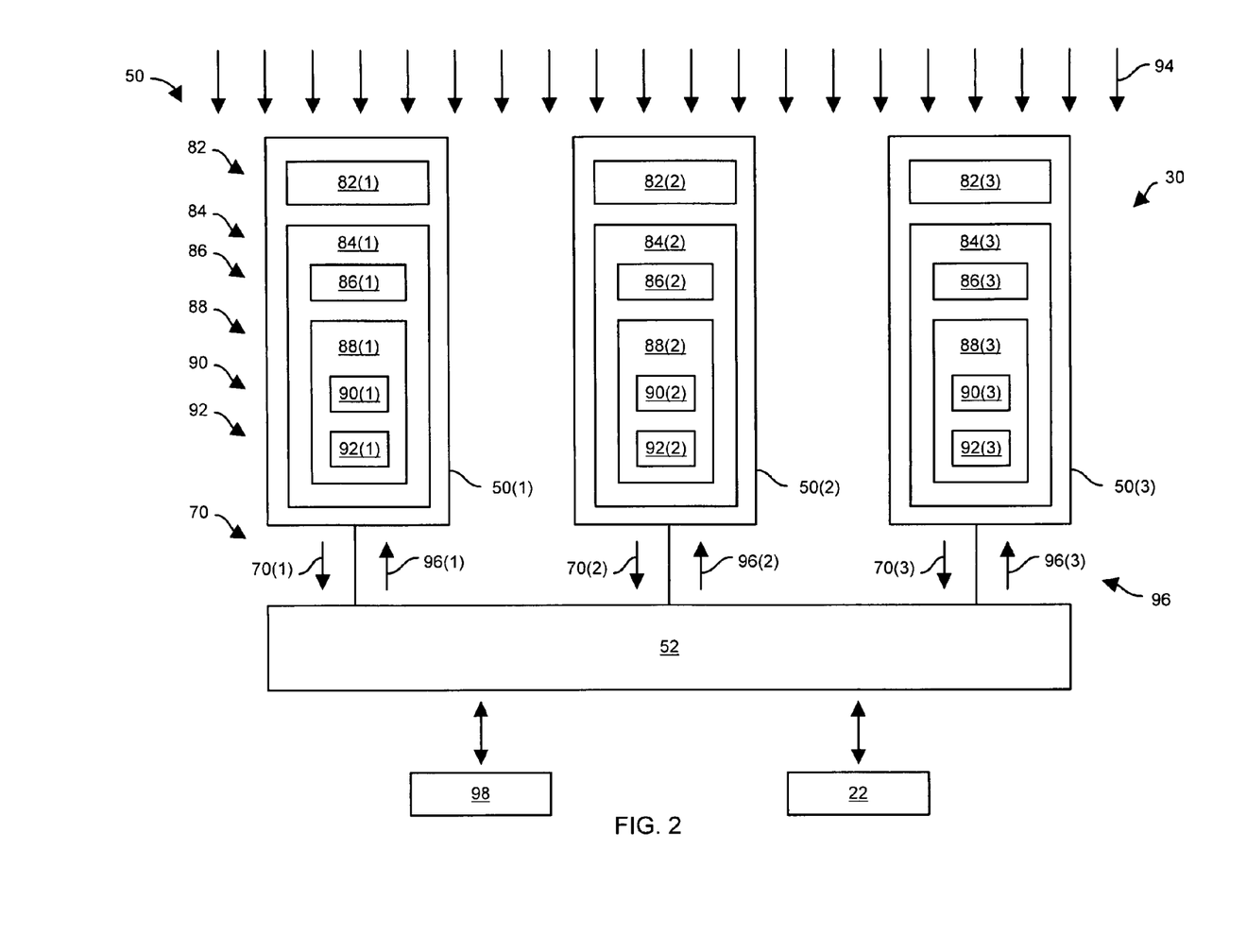
FIG. 2 is a block diagram of a sensor assembly of the direct drive servovalve control system of FIG. 1.

FIG. 2 shows particular details of the sensor assembly 30. As shown in FIG. 2, the set of programmable Hall sensors 50 includes three programmable Hall sensors 50(1), 50(2), 50(3) for triple redundant feedback to the controller 22. The programmable Hall sensors 50(1), 50(2), 50(3) include respective transducing portions 82(1), 82(2), 82(3) (collectively, transducing portions 82) and programmable circuitry portions 84(1), 84(2), 84(3). The programmable circuitry portions 84(1), 84(2), 84(3) (collectively, programmable circuitry portions 84) include respective processing circuits 86(1), 86(2), 86(3) (collectively, processing circuits 86) and memories 88(1), 88(2), 88(3) (collectively, memories 88) which are configured to store null position offsets values 90(1), 90(2), 90(3) (collectively, null position offsets 90) and gain adjustment values 92(1), 92(2), 92(3) (collectively, gain adjustments 92).

The transducing portions 82 (e.g., analog Hall elements or plates) reside adjacent the rotor assembly 42 to sense magnetic flux 94 from magnets of the rotor assembly 42, and thus reliably sense the rotational position of the rotor assembly 42 (also see the area 56 in FIG. 1). The programmable circuitry portions 84 are configured to digitize the outputs of the transducing portions 82 as well as adjust both the null positions and the gains of the programmable Hall sensors 50. In particular, the null position offsets 90 are configured to shift the actual null positions of the programmable Hall sensors 50 so that the operating nulls of the programmable Hall sensors 50 are simultaneously aligned with the maximum torque position of the motor 28, even though the physical positions of the transducing portions 82 are only coarsely aligned.

Additionally, the gain adjustments 92 are configured to standardize the gains of the programmable Hall sensors 50 so that the gains are the same from one programmable Hall sensor 50 to another even though the sensing aspects for each sensor 50 may be different due to differences in magnet strengths and differences in particular sensor positions. Accordingly, no gain compensation effort is required at the controller 22 when replacing a servovalve device 24.

As further shown in FIG. 2, the programmable Hall sensors 50 exchange signals with external devices through the interface 52 (e.g., a connector). In particular, the programmable Hall sensors 50 are configured to receive respective input signals 96(1), 96(2), 96(3) (collectively, input signals 96) through the interface 52 from a programming device 98. These input signals 96 include commands configured to store the respective null position settings 90 and the respective gain adjustment settings 92 within the memories 88. Such programming of the sensors 50 is capable of being accomplished during the servovalve device manufacturing process prior to shipping. Additionally, as mentioned earlier in connection with FIG. 1, the programmable Hall sensors 50 are configured to provide respective position signals 70(1), 70(2), 70(3) through the interface 52. The programming device 98 is capable of using these signals 70 during programming, and the electronic controller 22 is capable of using these signals 70 when operating the servovalve device 24 within the servovalve control system 20 of FIG. 1.

In some arrangements, the programmable Hall sensors 50 are formed of discrete components mounted to the circuit board 60. In other arrangements, the programmable Hall sensors 50 are standard off-the-shelf packaged devices which are readily available and relatively inexpensive. In some arrangements, multiple sensors 50 reside the same device package for easy co-location of sensors 50. In other arrangements, the sensors 50 reside in separate device packages for improved fault tolerance. An example of an off-the-shelf packaged device which is suitable for use as one of the programmable Hall sensors 50 is a precision programmable linear Hall effect sensor, Part No. MLX90215, provided by Melexis of Concord, N.H. Further details of certain embodiments of the invention will now be provided with reference to FIG. 3.

Figure 3:
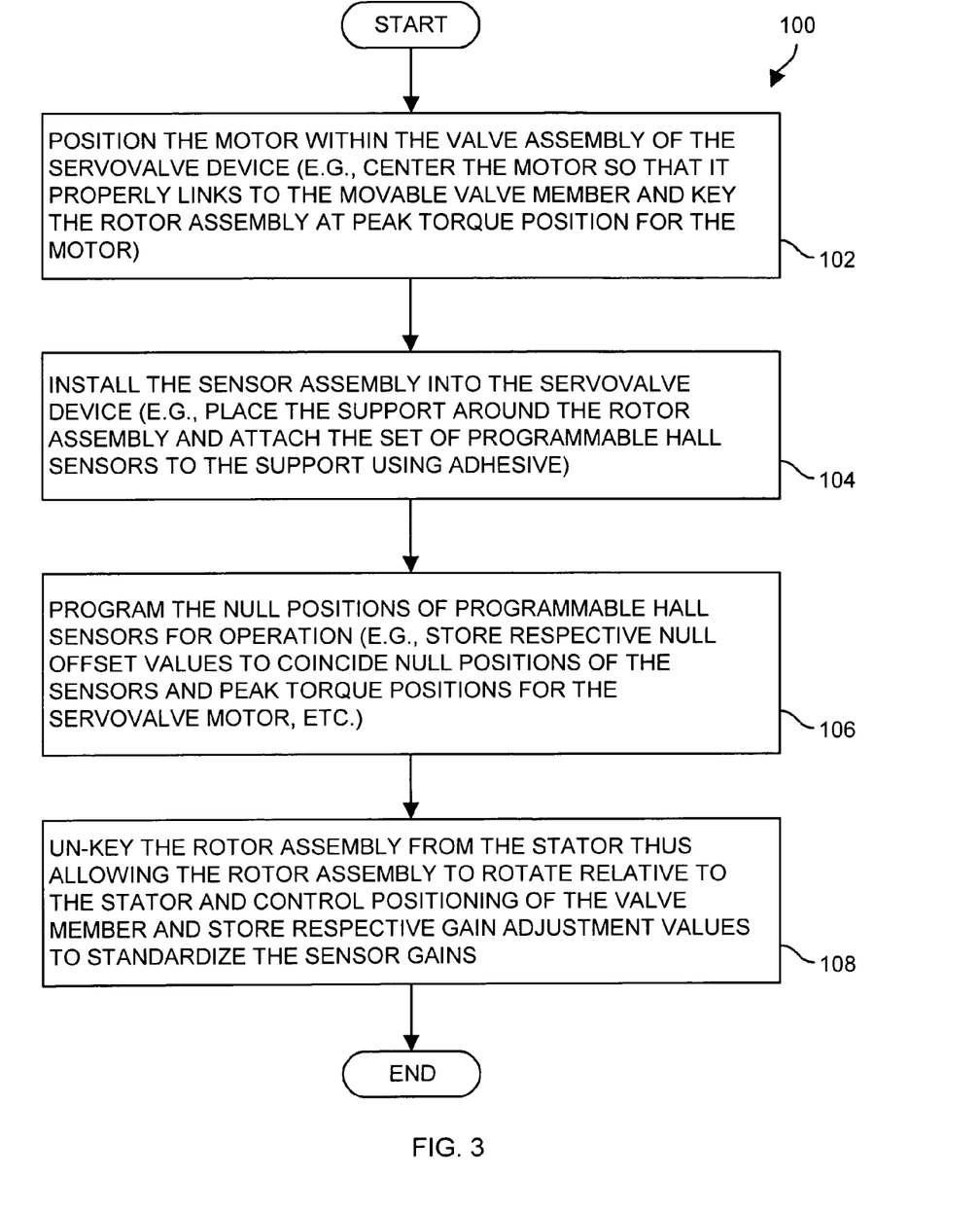
FIG. 3 is a flowchart of a procedure for manufacturing a direct drive servovalve device of the servovalve control system of FIG. 1.

FIG. 3 shows a procedure 100 which is performed by a manufacturer when manufacturing the servovalve device 24. In step 102, the manufacturer positions the motor 28 in the valve assembly 26. In particular, the manufacturer centers the motor 28 with the value assembly housing 32 and the movable valve member 36 and temporarily keys the rotor assembly 42 relative to stator 40 at the maximum torque position. At this point, the north locations (N) and south locations (S) of the rotor assembly 42 stay fixed relative to the windings within stator 40 and to the valve assembly housing 32 (also see FIG. 1).

In step 104, the manufacturer installs the sensor assembly 30 into the servovalve device 24. In particular, the manufacturer places the support 48 around the rotor assembly 42 (e.g., the support is a C-shaped ring or clip which fits around the shaft of the rotor assembly 42), and then attaches the set of programmable Hall sensors 50 to the support 48 (e.g., using adhesive 58). Accordingly, at least the sensing/transducer portions 82 of the sensors 50 are now co-located at a location 56 which is adjacent the magnetic motor shaft 42 for robust and reliable magnetic flux sensing. In one arrangement, the programmable Hall sensors 50 and the interface 52 reside on a circuit board 60 which is pre-assembled prior to installation into the servovalve device 24. In another arrangement, the programmable Hall sensors 50 and the interface 52 remain as discrete components which the manufacturer individually installs and connects together.

In step 106, the manufacturer programs the null offsets of the programmable Hall sensors 50 for operation. In particular, the manufacturer sets the respective null offset values 90 of the sensors 50 such that the sensing null positions of the sensors 50 coincide with the motors peak torque position. That is, the manufacturer sets the null offset value for each programmable Hall sensor 50 so that the Hall sensor null of that sensor 50 aligns with the maximum torque position of the motor 28.

In step 108, the manufacturer un-keys the rotor assembly 42 from the stator 40. As a result, the rotor assembly 42 is now free to rotate relative to the stator 40 in response to current through coils within the stator 40 (also see the control signals 72 in FIG. 2). Additionally, in step 108, the manufacturer sets the gain adjustment values such that the gains of the sensors 50 are all the same.

At this point, the Hall sensor nulls of the programmable Hall sensors 50 robustly and reliably coincide with the peak torque position of the motor 28. Furthermore, the gains of the programmable Hall sensors 50 are all the same thus alleviating the need for the controller 22 to compensate for differences magnet strength and sensor location relative to the rotor assembly 42 from servovalve device 24 to servovalve device 24. Moreover, in contrast to a difficult attempt by a manufacturer to mechanically set the nulls and gains of conventional Hall effect transducers, the procedure 100 is relatively simple and straight forward to carry out in a consistent and cost effective manner.

The controller 22 now is capable of receiving triple redundant feedback from the servovalve device 24. Such operation enables the controller 22 to operate in a variety of fault tolerant ways such as considering all three position signals 70(1), 70(2), 70(3) when they fall within a predetermined range of each other (e.g., +/−5%, +/−10%, +/−15%, +/−20%, etc.) and ignoring one of the position signals 70(1), 70(2), 70(3) if that position signal falls out of the predetermined range. Additionally, rather than rely on one particular position signal 70(1), 70(2), 70(3), the controller 22 is capable of operating in accordance with an average value to minimize any inadvertent variance in one of the position signals 70(1), 70(2), 70(3), etc. Other high availability and fault tolerance styles of operation (e.g., weighted contributions, quorums, alternating samples, etc.) are also suitable for use by the controller 22.

Furthermore, it should be understood that no adjustments need to be made to the controller 22 because the sensor gains are set to be the same. That is, the gain adjustment values 92(1), 92(2), 92(3) normalize the gains of sensors 50 from sensor 50 to sensor 50, and from servovalve device 24 to servovalve device 24. Accordingly, if a servovalve device 24 requires replacement with a new servovalve device 24. The controller 22 does not need any modification to compensate for a different gain since the new servovalve device 24 has the same gain as the previous servovalve device 24. Further details of embodiments of the invention will now be provided with reference to FIG. 4.

Figure 4:
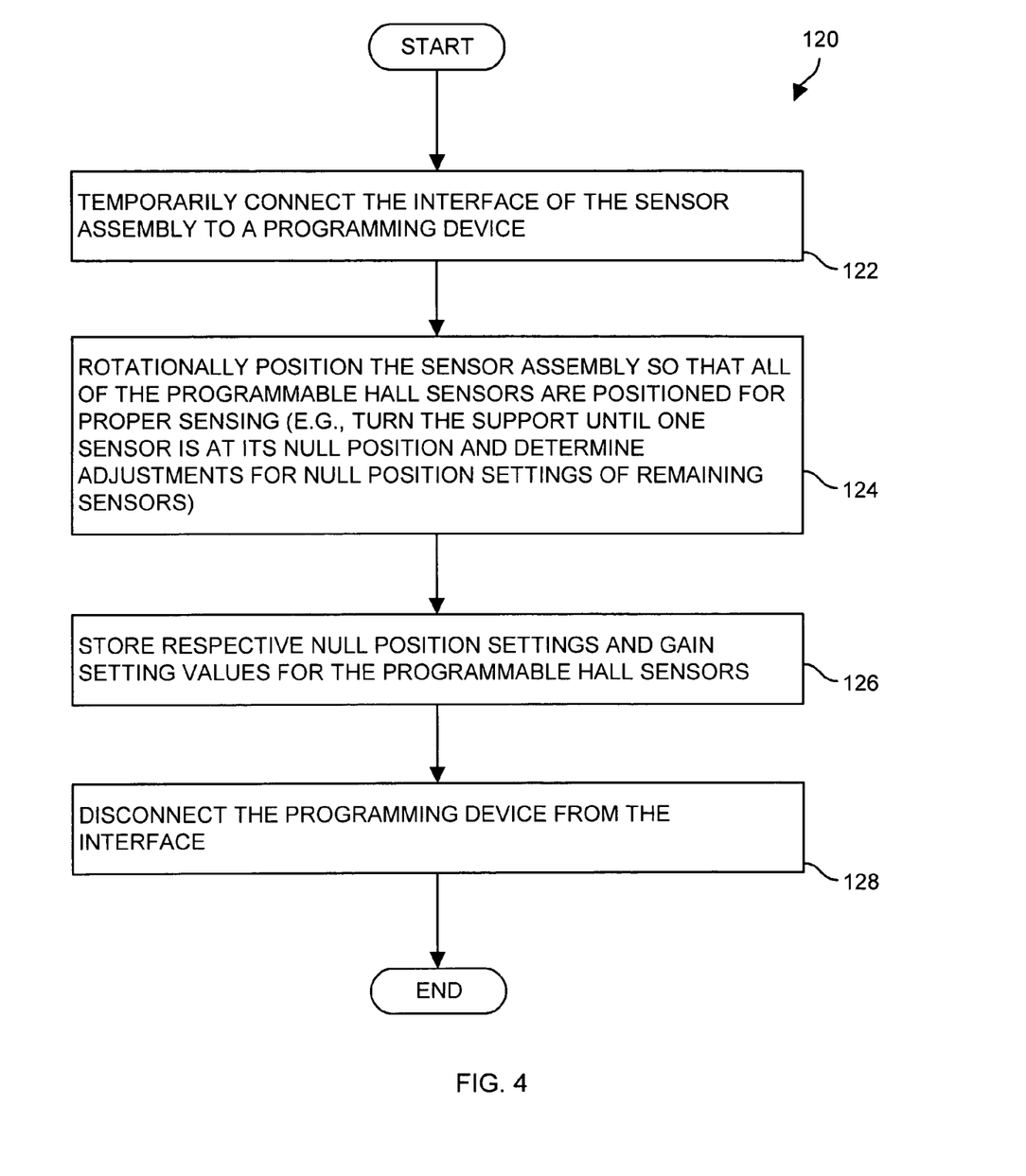
FIG. 4 is a flowchart of a procedure for synchronizing null positions of multiple programmable Hall sensors with a peak torque position of a motor which is suitable for use as one of the steps of the procedure of FIG. 3.

FIG. 4 shows a procedure 120 performed by a manufacturer which is suitable for use as the programming step in the procedure 100 (see steps 106 and 108 in FIG. 3). In step 122, the manufacturer temporarily connects the programming device 98 (FIG. 2) to the interface 52. The programming device 98 is now capable of exchanging information with each of the programmable Hall sensors 50 through the interface 52.

In step 122, the manufacturer adjusts the rotational orientation of the sensor assembly 30 relative to the motor 28 and the valve assembly 26. In some arrangements, the programming device 98 includes a meter which enables a technician to determine when all of the programmable Hall sensors 50 is rotationally positioned in a competent operating range relative to the rotor assembly 42. In one arrangement, the technician precisely positions one of the programmable Hall sensors 50 by aligning the null position of that sensor 50 with the peak torque position of the motor 28, i.e., so that the null position offset value 90 (FIG. 2) is essentially zero. In this arrangement, the sensing/transducing portions 82 of the remaining programmable Hall sensors 50 are coarsely adjusted, i.e., the remaining sensors 50 are close to their null positions since they are co-located with the aligned sensor and simply require a non-zero null position offset value 90 if any.

In step 124, the manufacturer stores null position values 90 and gain setting values 92 into the memories 88 of the programmable Hall sensors 50. In particular, the technician operates the programming device 98 to determine the proper null position values 90 which synchronize the null positions of all the programmable Hall sensors 50 and programs the sensors 50 accordingly by storing those null position values 90 in the respective memories 88. The technician additionally operates the servovalve to achieve a predetermined output. The programming device 98 is used to program the gains settings 92 of programmable Hall sensors 50 to provide the same (normalized) gain thus alleviating any need to adjust the controller 22 to accommodate different gains of different sensors 50 or of different servovalve devices 24. At this point, sensor calibration is complete.

In step 126, the manufacturer disconnects the programming device 98 from the interface 52 of the sensor assembly 30. Accordingly, the sensor assembly 30 is now properly configured for robust and reliable position sensing with triple redundancy and normalized gains.

As described above, embodiments of the invention are directed to techniques for providing multi-channel position feedback for servovalve motor operation using a set of programmable Hall sensors 50. Each programmable Hall sensor 50 is capable of having programmed adjustments made to set its null position and its gain, thus enabling convenient synchronization of all null positions as well as standardization of all gains. The use of such programmable Hall sensors 50 alleviates the need to physically synchronize the null position of each sensor 50 (e.g., a programmed offset for each sensor will easily synchronize null positions) as well as alleviates the need for making adjustments to an electronic servovalve controller 22 in an attempt to accommodate different gains (e.g., each sensor is capable of being programmed to have the same standard gain). Moreover, programmable Hall sensors are relatively inexpensive compared to conventional LVDT devices and are quite small thus enabling at least the sensing portions 82 of the programmable Hall sensors 50 to be co-located adjacent to a rotor assembly 42 of a servovalve motor 28.

While this invention has been particularly shown and described with references to preferred embodiments thereof, it will be understood by those skilled in the art that various changes in form and details may be made therein without departing from the spirit and scope of the invention as defined by the appended claims.

For example, the sensor assembly 30 was described above as including exactly three programmable Hall sensors 50 for triple redundant feedback. A different number of sensors 50 are suitable for use as well as such as two (e.g., when simple redundancy is adequate), four, etc.

Additionally, it should be understood that all of the sensors 50 were described above as being co-located on a common area 56 of the support 48. Other configurations are suitable as well such as positioning the sensors 50 in a distributed manner around the periphery of the rotor assembly 42, positioning each sensor 50 on a separate support 50, etc.

Furthermore, it should be understood that the support 48 was described above as providing a reliable means of support to the set of programmable Hall sensors 50 by fitting around the rotor assembly 42. Other configurations are suitable for use as well such as mounting the sensor assembly 30 to a different shaped member or fastening the sensor assembly 30 directly to on of a variety of selectable installation locations on the valve assembly housing 32 or on the stator 40. Such modifications and enhancements are intended to belong to particular embodiments of the invention.

What is claimed is:

1. A servovalve device, comprising:
   a servovalve motor having a stator and a rotor assembly configured to rotate relative to the stator;
   a valve member coupled to the rotor assembly; and
   a sensor assembly which includes:
      an interface configured to couple to a controller that controls the servovalve motor,
      a set of programmable Hall sensors coupled to the interface, and
      a collar coupled to the set of programmable Hall sensors, the collar carrying the set of programmable Hall sensors at an installation location which is (i) adjacent to the rotor assembly and (ii) fixed relative to the stator, the set of programmable Hall sensors being configured to provide a set of position signals to the controller through the interface, the set of position signals identifying a rotational position of the rotor assembly relative to the stator;
   wherein the collar is configured to fit around the rotor assembly, and wherein the collar defines a common sensing area at which at least a portion of each programmable Hall sensor is co-located; and
   wherein the collar and the set of programmable Hall sensors are configured to rotate about the rotor assembly of the servovalve motor and relative to the stator of the servovalve motor between a first rotational orientation and a second rotational orientation, the second rotational position aligning at least one Hall sensor of the set of programmable Hall sensors with a maximum torque position of the motor such that a null position of the at least one Hall sensor aligns with the maximum torque position of the motor,
   wherein each programmable Hall sensor of the set of programmable Hall sensors comprises a programmable circuitry portion, each programmable circuitry portion being configured to adjust the null position of the corresponding programmable Hall sensor such that the null position of the corresponding programmable Hall sensor is aligned with the maximum torque position of the servovalve motor;
   wherein the rotor assembly is operable to rotate clockwise and counterclockwise within an arc range between a first arc position and a second arc position to position the valve member linearly within a fluid pathway between a fully closed position and a fully open position;
   wherein the rotor assembly is operable to rotate clockwise and counterclockwise within a limited arc range that is less than 360° to position the valve member linearly within the fluid pathway between the fully closed position and the fully open position; and
   wherein each programmable Hall sensor of the set of Hall sensors is co-located in positional proximity to each other at the common sensing area defined by the collar such that at the second rotational position where the at least one Hall sensor of the set of programmable Hall sensors align with the maximum torque position of the motor such that the null position of the at least one Hall sensor aligns with the maximum torque position of the motor, the remaining Hall sensors of the set of Hall sensors are disposed in a substantially null position relative to the maximum torque position of the motor, and the set of programmable Hall sensors configured to provide redundant feedback;
   wherein:
   the maximum torque position of the motor comprises a position of the rotor assembly relative to the stator when the rotor assembly centers the valve member within a housing; and
   the null position of the corresponding programmable Hall sensor comprises a configuration of the corresponding programmable Hall sensor where the corresponding programmable Hall sensor generates an operational null value.

2. The servovalve device of claim 1 wherein each programmable Hall sensor includes a transducer and programmable circuitry configured to output, as one of the position signals, an output voltage based on (i) magnetic sensing by the transducer and (ii) a respective null offset value to coincide null points of the set of programmable Hall sensors.

3. The servovalve device of claim 1 wherein each programmable Hall sensor includes a transducer and programmable circuitry configured to output, as one of the position signals, an output voltage based on (i) magnetic sensing by the transducer and (ii) a respective gain adjustment value to normalize gains of the set of programmable Hall sensors.

4. The servovalve device of claim 1 wherein the set of programmable Hall sensors includes exactly three programmable Hall sensors which are configured to respectively provide, as the set of position signals, three output voltages through the interface for triple redundant feedback.

5. The servovalve device of claim 1 wherein the sensor assembly further includes:
   a circuit board attached to the collar, the circuit board electrically connecting the set of programmable Hall sensors to the interface.

6. The servovalve device of claim 1, wherein the servovalve motor is configured as a direct drive servovalve motor, the stator having a set of coils configured to receive a control signal from the controller and the rotor assembly having at least one magnet, the rotor assembly configured to rotate relative to the stator in response to the control signal received by the coils.

7. The servovalve of claim 1, wherein each programmable circuitry portion is configured to adjust a gain of the corresponding programmable Hall sensor such that the gains of each programmable hall sensor are substantially equal.

8. The servovalve of claim 1, wherein each programmable circuitry portion being configured to adjust a null position of the corresponding programmable Hall sensor comprises each programmable circuitry portion being configured to adjust a null position offset of the corresponding programmable Hall sensor such that the operational null position of each corresponding programmable Hall sensor is aligned with the maximum torque position of the servovalve motor.

9. The servovalve of claim 1, wherein the collar comprises a locking mechanism positionable between (i) a first position to allow rotation of the collar and the set of programmable Hall sensors about the rotor assembly of the servovalve motor and relative to the stator of the servovalve motor and (ii) a second position to secure the collar and the set of programmable Hall sensors relative to the maximum torque position of the motor such that the null position of the at least one Hall sensor aligns with the maximum torque position of the motor.

10. The servovalve of claim 1, wherein the limited arc range is between +/−20°.

11. The servovalve of claim 1, wherein the servovalve device comprises the housing defining the fluid pathway, the valve member disposed within the fluid pathway, the valve member configured as a spool having at least one land and the spool being disposed within the fluid pathway, the rotor assembly configured to position the at least one land linearly within the fluid pathway between a first position relative to a port of the servovalve device to cover the port with the at least one land, the first position being the fully closed position, and a second position relative to the port of the servovalve device to uncover the port with the at least one land, the second position being the fully open position to control an amount of fluid flowing through the fluid pathway.

12. The servovalve of claim 1, wherein the servovalve motor having the stator and the rotor assembly is a limited angle motor configured to rotate the rotor assembly clockwise and counterclockwise within the limited arc range that is less than 360° to position the valve member linearly within the fluid pathway between the fully closed position and the fully open position.

* * * * *